H. A. LAYCOCK.
REGULATING SYSTEM.
APPLICATION FILED APR. 28, 1913.
1,109,236.
Patented Sept. 1, 1914.
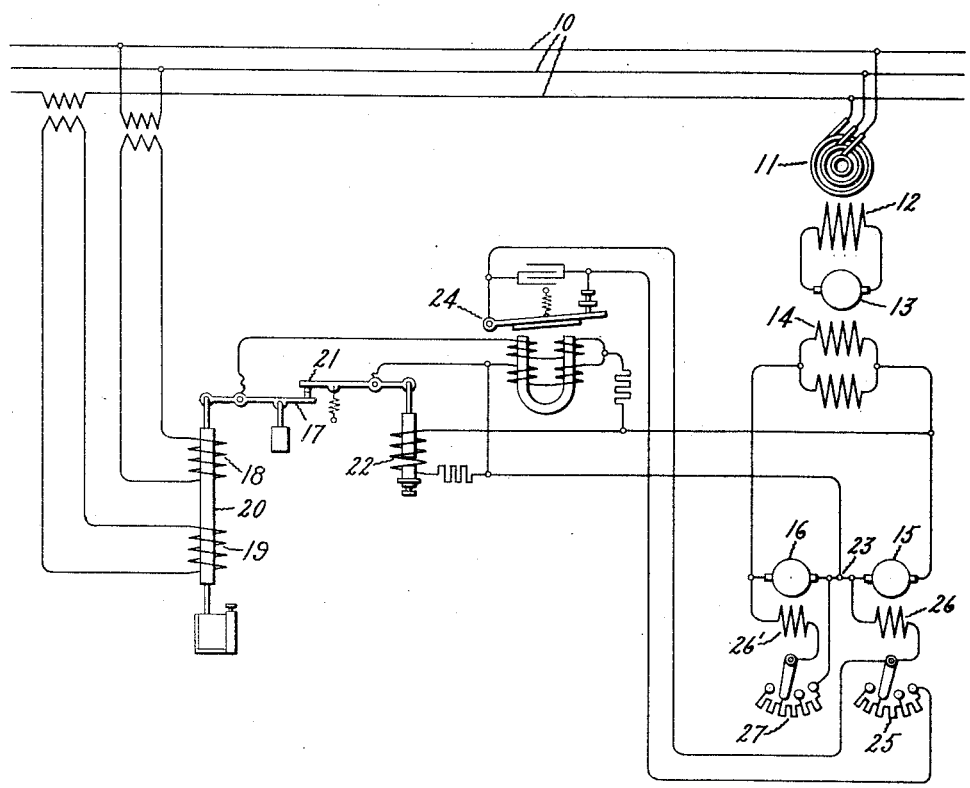
Witnesses:
Earl G. Klock.
J. Ellis Glen.
Inventor:
Harry A. Laycock,
by
His Attorney.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

REGULATING SYSTEM.

1,109,236.   Specification of Letters Patent.   Patented Sept. 1, 1914.

Application filed April 28, 1913. Serial No. 763,988.

*To all whom it may concern:*

Be it known that I, HARRY A. LAYCOCK, a citizen of the United States, residing at Schenectady, county of Schenectady, State of New York, have invented new and useful Improvements in Regulating Systems, of which the following is a specification.

My invention relates to means for regulating the electrical condition, that is, voltage, current, or power factor of a system of electrical distribution, and more particularly to means of that character which includes a vibrating contact regulator such as that disclosed in Tirrill Patent #726,234.

The object of my invention is to increase the range of regulation which may be secured by such means.

Regulators of the vibrating contact type such as that disclosed in Tirrill Patent #726,234, have one of the electromagnetic coils which actuate the said contacts connected across the exciter leads. When a single exciter is used, the range of regulation is considerably limited because of the fact that it is not feasible to reduce the excitation of the exciter field so that it approaches zero. This is because such a procedure would cause the vibration of the regulator contact controlled by the electromagnetic coil connected across the exciter leads to cease and it has been found in practice that good regulation can not be secured when there is at times a cessation of the said vibration.

According to my invention I connect in opposition two sources of electrical energy, at least one of which is a dynamo electric machine, for supplying the excitation directly or indirectly to the main dynamo electric machine and connect an electromagnetic coil controlling a contact of the regulator across the armature leads of one of the exciting dynamo electric machines, if two are used, which is also the machine whose excitation is controlled by the said regulator, or if one machine and a battery or other source of energy are used, then the regulator coil is connected across the armature leads of the machine. The said machine is preferably designed to be of a higher voltage than the source of electromotive force which opposes it. The result secured by this system is that while the voltage or current delivered to the main machine is the difference between that of the two sources, that delivered to the regulator coil is that of one of the same.

One application of my invention is to systems wherein a synchronous condenser is used to keep the voltage at a point in the line constant. This is done by varying the field excitation of the synchronous condenser according to the said voltage by means of a regulator of the vibrating contact type such as that disclosed in Tirrill Patent #726,234. On long transmission lines, it frequently occurs that the voltage is higher at the receiving end than at the distributing end, and in order to take care of such a condition, the excitation of the condenser must be practically zero. By the use of my invention, this may be readily accomplished without causing the regulator contacts to cease vibrating.

My invention will be more clearly understood by reference to the accompanying drawing in which a system embodying my invention is illustrated diagrammatically.

In the drawing 10 represents the mains of an alternating current distribution system. Connected across the said mains is the synchronous motor 11. The field 12 of the said motor is excited by the direct current exciter 13. The field 14 of the said exciter is in turn excited by the direct current generators 15, 16. The generator 15 is of a higher voltage than the generator 16. For instance, the generator 15 may be of 250 volts maximum, while the generator 16 is of 125 volts maximum. The said generators are so connected that they oppose each other and the energy supplied to the field 14 is the differential of that generated by the machines. At the left of the figure is shown a regulator such as that disclosed in Tirrill Patent #726,234 and consisting of the floating contact 17 which is actuated by an electromagnet consisting of coil 18 which is connected across the distributing main 10 and the coil 19 which is connected in series therewith both acting upon the core 20 which is connected to a lever carrying the aforesaid contact. The vibrating contact 21 is actuated by an electromagnet consisting of the coil 22 which is connected to one of the leads from the generator 15 and to the middle point 23 between the generators 15 and 16. The aforesaid contact serves to cut in and out through the relay 24, the resistance 25 in the field 26 of the generator 15. The field 26' of the generator 16 has included therein a variable resistance 27.

It will be apparent from the foregoing that the field 14 of the exciter 13 will receive the differential between the voltages of the generators 15 and 16. The voltage of the generator 15 will be controlled by means of the vibrating regulator. The voltage of the generator 16 may be initially adjusted by means of the resistance 27 and will remain constant thereafter. When the voltage of the generator 15 is at a maximum, say, 250 volts, and the generator 16 is at 125 volts, the differential, namely, 125 volts, will be supplied to the field 14. When both generators 15 and 16 are 125 volts the result will be zero and the synchronous condenser will have practically no excitation. However, at such times the coil 22 of the regulator will receive current at 125 volts. It is apparent therefore that the excitation of the synchronous condenser can be reduced practically to zero without reducing the energy supplied to the coil 22 in a way detrimental to the action of the regulator.

Various modifications of the above described structure will suggest themselves to those skilled in the art, and are to be considered as coming within the spirit and scope of my invention as set forth in the annexed claims.

What I claim as new and desire to secure by Letters Patent of the United States, is:—

1. A means for regulating the electrical condition of a circuit comprising a dynamo electric machine connected thereto and an exciting means for the said machine comprising two sources of electrical energy connected in opposition, at least one of said sources being a dynamo electric machine, and means controlled by the electrical condition of the aforesaid circuit and of the latter dynamo electric machine for regulating the field excitation of the said machine.

2. A means for regulating the field excitation of a dynamo electric machine comprising two sources of electrical energy connected in opposition, one of said sources being a dynamo electric machine, and a regulator of the vibrating contact type for the field of the latter dynamo electric machine having an electromagnetic coil connected across the armature leads thereof.

3. A means for regulating the field excitation of a dynamo electric machine comprising two sources of electrical energy connected in opposition, one of said sources being a dynamo electric machine, and a regulator of the vibrating contact type having coils connected across the leads of the former and latter dynamo electric machines respectively.

4. A system for regulating the electrical condition of a circuit comprising a dynamo electric machine and means for exciting the field thereof comprising two sources of electrical energy connected in opposition, one of said sources being a dynamo electric machine, and a regulator of the vibrating contact type for the field of the latter dynamo electric machine having an electromagnetic coil connected in the aforesaid circuit and another coil connected across the armature leads of the said machine.

5. A means for regulating the field excitation of a dynamo electric machine comprising a pair of generators connected in opposition and a regulator of the vibrating contact type for the field of one of said generators having an electromagnetic coil connected across the armature leads of the said generator.

6. A means for regulating the field of a dynamo electric machine comprising a pair of exciting generators connected in opposition and a regulator of the vibrating contact type for one of the same having a coil connected with the circuit to be controlled and the other across the armature leads of the regulated generator.

7. A system for regulating the electrical condition of a circuit comprising a dynamo electric machine, and means for exciting the field of the same comprising a pair of generators connected in opposition and a regulator of the vibrating contact type for the field of one of said generators having an electromagnetic coil connected to the aforesaid circuit and another coil connected across the armature leads of the regulated generator.

In witness whereof, I have hereunto set my hand this 25th day of April 1913.

HARRY A. LAYCOCK.

Witnesses:
BENJAMIN B. HULL,
HELEN ORFORD.